…

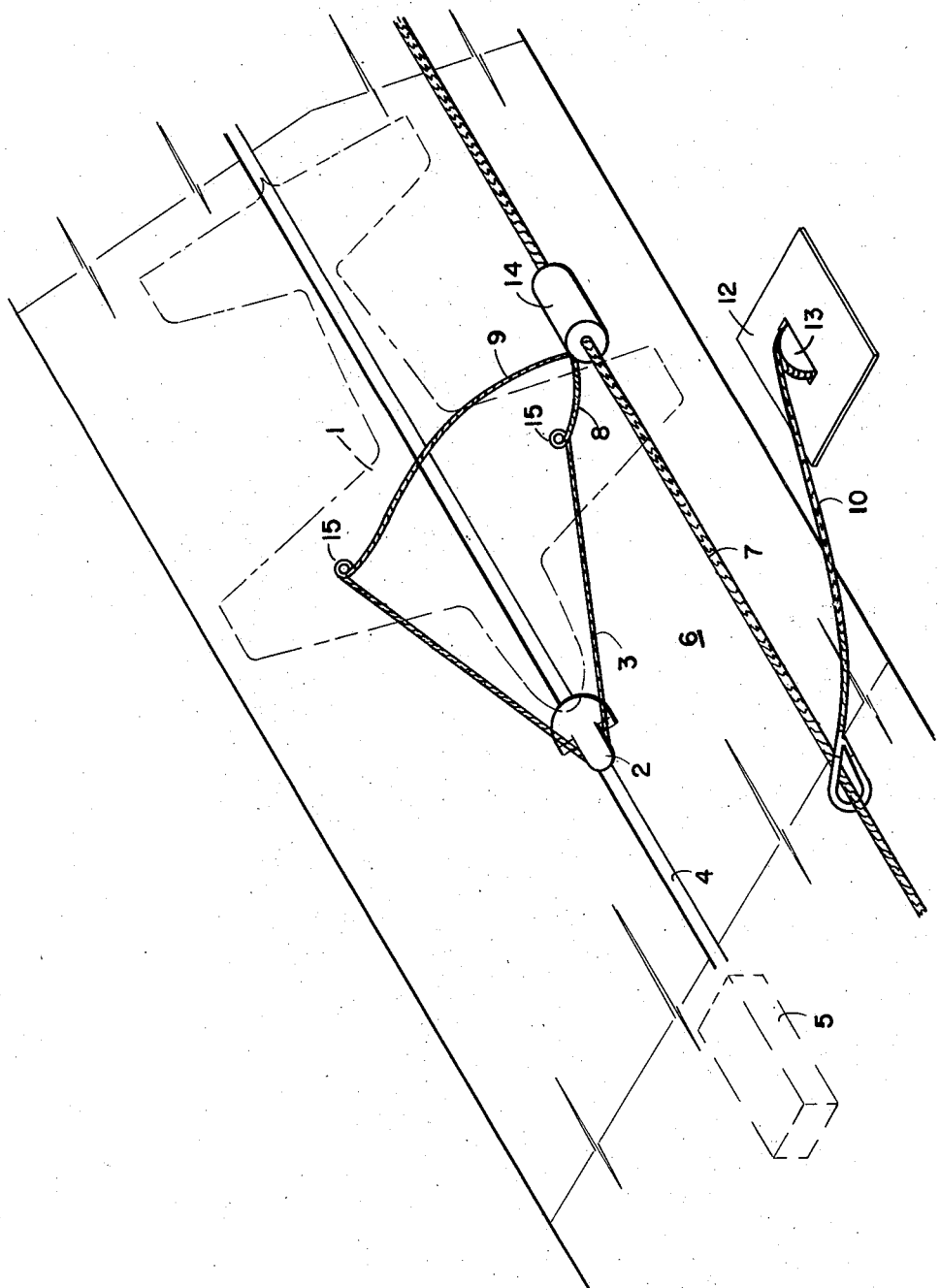

United States Patent Office 2,862,681
Patented Dec. 2, 1958

2,862,681

METHOD FOR ARRESTING BRIDLES AND PENDANTS

George J. Rolandelli, Wilmington, and Raymond M. Ballard, Newark, Del., assignors, by mesne assignments, to the United States of America as represented by the Secretary of the Navy Application September 18, 1956, Serial No. 610,696

5 Claims. (Cl. 244—63)

This invention relates to means for arresting bridles and pendants or auxiliary equipment used in conjunction with launching devices for aircraft.

In prior launching devices no means have been used to arrest auxiliary equipment used in conjunction with the launching devices. Many items of use, as for example bridles and pendants, if left uncontrolled, attain sufficient velcocity and/or are of sufficient weight to seriously incapacitate personnel. In the aforesaid example, bridles may weigh approximately 300 lbs. Taking this together with the speed of the launched aircraft, it is fairly evident that having such a bridle free upon release of the aircraft creates a serious safety hazard on shipboard.

It is an object of this invention therefore to provide an arresting means for auxiliary equipment used in launching devices.

It is a further object of this invention to provide an auxiliary equipment arresting device which can be used on present installations without expensive modifications of such installations.

These and other objects will be readily apparent to those skilled in the art from an examination of the following disclosure and attached drawing wherein:

The single figure depicts in an isometric view a schematic layout of the invention.

In the figure a launching platform 6, such as a carrier's deck, has an aeroplane 1 ready to be launched. Shuttle 2 rides in slot 4 and is connected to the power launching equipment below decks. At the end of the slot 4, an arresting engine 5 provides the arresting power for shuttle 2 after the aircraft has been launched and released. To connect the power shuttle 2 to the aircraft, a bridle or cable 3 is connected, as by release hooks engaging bridle loops 15, to the underside of the wings of the plane 1; the bridle at its approximate midpoint straddles the shuttle 2.

Running parallel to deck slot 4 is a cable 7 on which rides a probe or shuttle 14. Lanyards 9 couple the looped ends 15 of the cable 3 to the probe 14; the lanyards can be coupled to the probe 14 using any conventional fastening means well known in the art. Up-deck of the probe 14, a cable 10 is looped as at 11 over the cable 7; the opposite end of the cable 10 is secured to a flush-deck energy absorber 12. In the instant case, the absorber 12 has a pulley 13 around which cable 10 is reeved; however, the absorber, per se, may be of any conventional design as the particular details of the absorber form no part of the present invention.

In the operation of the system, airplane 1 is launched in the usual manner by having shuttle 2 shot forward thus adding to the airplane's own power. When the plane reaches a speed exceeding the speed of the shuttle, it releases itself from the cable 3 and continues its flight. The shuttle on other hand, comes to rest by being braked by the engine 5; the bridle 3 which has been pulling probe 14 along with itself is usually detached from the shuttle. With the residual speed of the birdle 3 and the probe 14, the latter element engages loop 11 of the cable 10 and is brought to a stop by the absorption of the energy in absorber 12.

Other modifications are possible, as for example, by having a plurality of lines 8 and 9 attached at various points to the cable 3. Thus the bridle 3 is brought to a more uniform stop with a minimum of whipping of the bridle.

Obviously many modifications and variations of the present invention are possible in the light of the above teachings. It is therefore to be understood that within the scope of the appended claims the invention may be practiced otherwise than as specifically described.

What is claimed is:

1. In a launching device for launching an aircraft from a carrier deck or the like, power driven shuttle means movable in a fixed path and predetermined direction along said deck, bridle means for connecting said shuttle means and an aircraft to be launched having the ends thereof detachably connected to said aircraft to be launched and the medial portion thereof detachably carried by said shuttle means, said bridle means becoming detached from said aircraft to be launched and said shuttle means and being movable independently thereof after said shuttle means and said aircraft to be launched have been moved through a predetermined range of movement in said fixed path, first cable means juxtaposed said deck and extending substantially parallel to said fixed path of said shuttle means, probe means slideably carried by said first cable means, lanyard means connecting said bridle means and said probe means and being operable to pull said probe means along said first cable means upon movement of said shuttle means and said aircraft to be launched along said deck in said fixed path, second cable means associated with said first cable means and having one end thereof slideably connected to said first cable means, said one end of said second cable means being engaged and moved along said first cable means by said probe means after said bridle means becomes detached from said shuttle means and said aircraft to be launched, and energy absorber means associated with said second cable means for arresting the movement of said second cable means and said probe means after the engagement of said one end of said second cable means with said probe means to thereby arrest the movement of said detached bridle means.

2. In a launching device for launching an aircraft from a carrier deck or the like as claimed in claim 1 wherein said fixed path of said shuttle means is defined by a slot in said carrier deck.

3. In a launching device for launching an aircraft from a carrier deck or the like as claimed in claim 1 wherein said bridle means is comprised of a cable having loops formed in the ends thereof, said loops being detachably engageable with release hooks or the like carried by said aircraft to be launched.

4. In a launching device for launching an aircraft from a carrier deck or the like as claimed in claim 3 wherein said lanyard means connects said probe means to the loops in the ends of said cable.

5. In a launching device for launching an aircraft from a carrier deck or the like wherein said one end of said second cable means is provided with a loop therein which is slideably carried by said first cable means and wherein said energy absorber means includes a pulley, said second cable means being reeved on said pulley.

References Cited in the file of this patent

UNITED STATES PATENTS

| | | |
|---|---|---|
| 2,452,618 | Weeks | Nov. 2, 1948 |
| 2,514,406 | Maxson | July 11, 1950 |
| 2,672,306 | Doolittle et al. | Mar. 16, 1954 |